Patented July 29, 1952

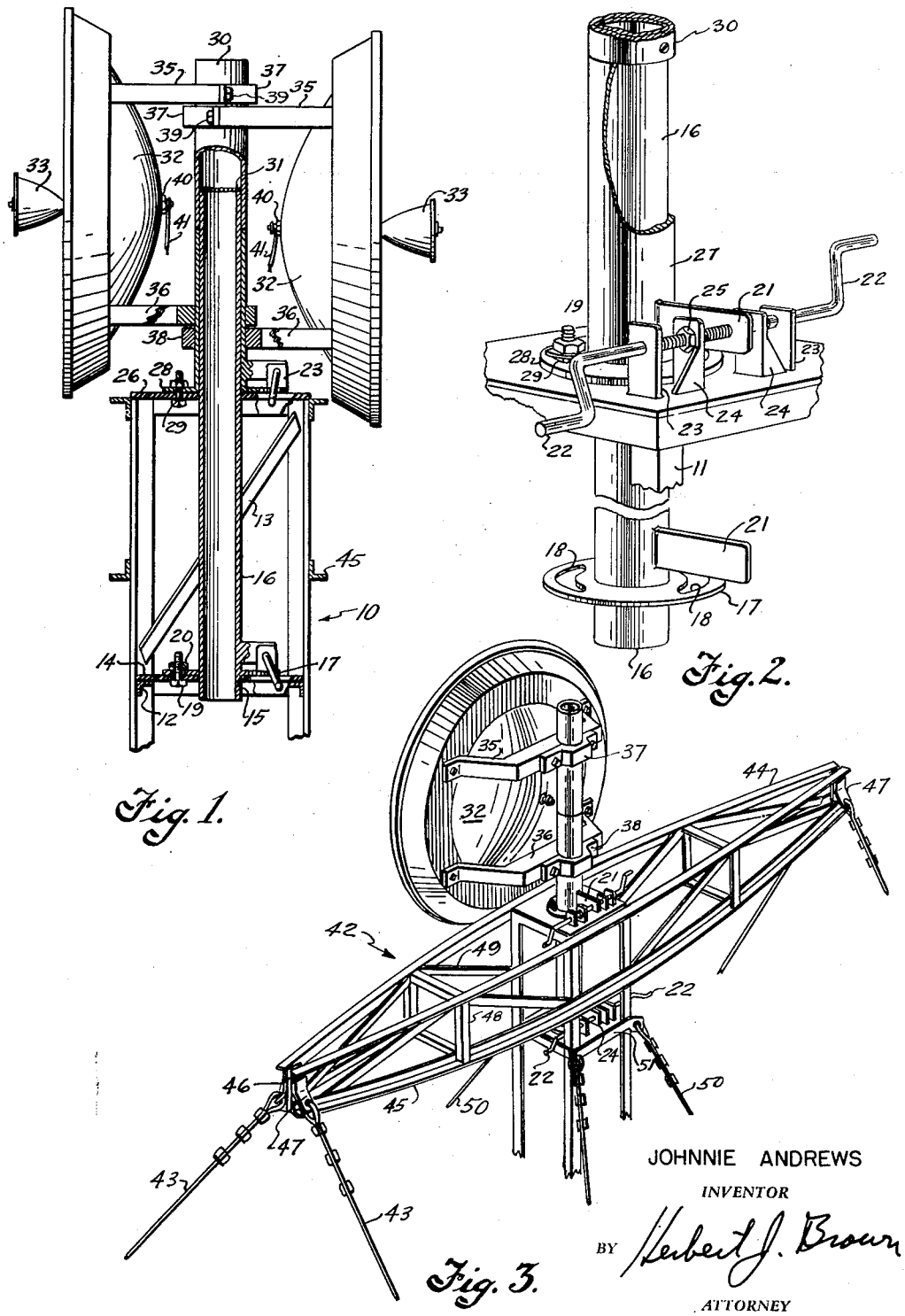
JOHNNIE ANDREWS
INVENTOR
BY Herbert J. Brown
ATTORNEY

2,605,417

UNITED STATES PATENT OFFICE 2,605,417

TRANSMISSION TOWER

Johnnie Andrews, Fort Worth, Tex.

Application May 27, 1950, Serial No. 164,773

4 Claims. (Cl. 250—33.65)

1

This invention relates to towers for transmitting high frequency radio signals. Particularly, the invention has reference to the transmission of beamed micro waves from tower to tower wherein each tower or station of the system is provided with a transmitter and a receiver arranged for relaying the signals in either direction. The towers include parabolic or similarly shaped reflectors for beaming the signals to and from the antennas located in their focus points.

The beamed signals are relatively narrow, and the axial center of a reflector on one tower must be accurately aligned with the axial center of a reflector on the next tower of the system. When installing the reflectors it has been found that the referred to alignment is difficult to effect, and that ordinary clamping and securing operations cause misalignment after the reflectors have been tuned. It is an object of the invention to provide a reflector orientating means whereby opposing reflectors on separate towers may be accurately aligned or tuned with each other, and which means will maintain the reflectors in alignment while the same are being clamped and secured in place.

Since towers of the described class are tall and narrow they are subjected to torque by the wind, and any such torque will cause misalignment of the tuned reflectors. It is a further object of the invention to provide a tower construction which will resist torque caused by the wind.

The invention will be more readily understood by reference to the accompanying drawings and the following description.

Figure 1 is a broken vertical sectional and elevation of the upper end of a tower embodying a preferred form of the invention.

Figure 2 is a broken perspective view of a part of the reflector orientating mechanism illustrated in Figure 1.

Figure 3 is a perspective view of the upper end of the tower and having one of the reflectors removed so as to illustrate more clearly the guying beam employed to resist torque at the top of the tower.

In the drawings, the numeral 10 generally designates a tower comprised of vertical corners 11, horizontal cross members 12, and diagonal truss members 13, all secured to each other in the usual manner. Within and spaced from the top of the tower 10 there is a horizontal supporting plate 14 having an opening 15 rotatably securing the lower end of a tubular shaft 16. A flange 17 around the shaft 16 and spaced from its lower end rests upon the upper surface of the supporting plate 14. As shown in Figure 2, arcuate slots 18 are formed through the flange 17 to receive one or more bolts 19 positioned through the plate 14 and have lock nuts 20 on their ends to secure the shaft after orientation.

Above the flange 17 there is an adjusting arm 21 projecting from the side of the shaft 16 and

2 spaced from the upper surface of the plate 14. The inner ends of opposingly arranged cranks 22 engage opposite sides of the adjusting arm 21. Each crank 22 is supported by a bearing plate 23 and a threaded bracket 24, both of which project upwardly from the surface of the plate 14 and outwardly of the flange 17. A lock nut 25 on each crank 22 is arranged to engage the surface of its adjacent bracket 24 for locking the end of the crank in position against one side of the adjusting arm 21.

On the upper end of the tower 10 there is another supporting plate 26 rotatably receiving the upwardly projecting end of the shaft 16 therethrough. Another tubular shaft 27 is rotatably mounted around and in turning contact with the first described shaft 16, and is also provided with a flange 28 around its lower end for supporting the last described shaft 27 on the upper surface of the upper supporting plate 26. Arcuate slots 29 are formed in the flange 28 in the same manner as the previously described slots 18 in the first described flange 17. Locking bolts 19 and nuts 20 are positioned through the upper supporting plate 26 and the tubular shaft 27 in its desired oriented position.

An adjusting arm 21 corresponding with the one already described, projects from the side of the outer shaft 27 and is positioned between the opposing ends of thread cranks 22. As before, the cranks 22 are supported by bearing plates 23 and threaded brackets 24 which, in this part of the structure, project upwardly from the upper plate 26.

The upper end of the first shaft 16 extends above the upper end of the second shaft 27 where it is provided with a tubular extension 30. The extension 30, is of the same diameter as the second shaft 27, and may be welded or otherwise secured to the first shaft 16 as indicated at 31.

The shafts 16 and 27, together with the extension 30, support a pair of parabolic reflectors 32 in generally back to back relation and with their axes in generally horizontal positions. Antennas 33 are mounted in the focal points of the respective reflectors 32. Each reflector 32 is supported in a flanged ring 34 having upper and lower horizontal brackets 35 and 36 formed to engage one-half of the diameter of the extension 30 or one-half the diameter of the outer shaft 27, respectively. Corresponding clamps 37 and 38, respectively, are positioned around the extension 30 and outer shaft 27, and both are secured by bolts 39 to the brackets 35 and 36. Binding posts 40 in the centers and projecting from the rear surfaces of the reflectors 32 are connected with a transmitter and a receiver, not shown, by means of wires 41.

The upper end of the tower 10 is secured against torque by means of a transverse guy beam 42, the ends of which extend outwardly and are secured to guys 43 anchored in the earth's surface at substantial distances from each other. The beam construction is comprised of upper and lower horizontal corner members 44 and 45 welded to the corner members 11 of the tower 10 and on the sides thereof beneath the reflectors 32. The respective upper and lower horizontal members 44 and 45 are brought together at their outer ends and are secured to vertical end pieces 46 welded therebetween. Angular brackets 47 are welded to the end pieces 46, and the referred to guys 43 are connected with said brackets. The horizontal members 44 and 45 are secured in their relative positions by means of cross members 48, and the beam 42 is further secured and strengthened by means of diagonals 49 connected between the tower corners 11 and the cross members 48, and between said cross members and the end pieces 46.

Other guys 50 are connected with a square frame 51 secured around the tower 10, and which guys are also anchored in the earth's surface at substantial distances from each other.

In operation, the reflectors 32 are mounted on the extension 30 and the outer shaft 27 in the manner described and as illustrated in Figure 1. The clamping bolts 39 of one upper clamp 37 are loosened, and the corresponding bolts of the lower clamp 38 supporting the same reflector 32 are tightened. The bolts 39 through the remaining upper and lower clamps 37 and 36 are respectively tightened and loosened in the reverse manner from that described with respect to the first referred to arrangement. The lower locking bolt 19 and nuts 20 in the lower supporting plate 14 and extending through the slots 18 of the lower flange 17 are loosened and the lower cranks 22 are operated to move the lower adjusting arm 21 and to thereby orient the extension 30 and the reflector 32 tightly secured thereto. When the affected reflector is accurately tuned with a reflector of another tower, the lock nuts 25 on the lower cranks 22 are secured against their respective threaded brackets 24.

The upper cranks 22 are then operated in the same manner as the foregoing, and act upon the upper adjusting arm 21 to rotate the outer shaft 27 and orient the reflector 32 secured thereon. The upper lock nuts 25 are then positioned against adjacent brackets 24, and after which all clamp nuts 39, both upper and lower, are tightened.

It is possible to tune both reflectors 32 with only one adjusting arm 21, but such adjustment requires more skill and time than the preceding description of operation. For example, the lower cranks 22 and lower adjusting arm 21 may be eliminated and both of the upper clamps 37 loosened about the extension 30 which is secured against rotation, as by means of the lower locking bolt 19 and nut 20. Both of the lower clamps 38 are tightened around the outer shaft 27 and the latter is oriented until one of the reflectors 32 is tuned with a reflector of another tower. The clamp 37 at the upper end of the tuned reflector is then tightened and its lower clamp 38 of the same reflector is loosened. By again operating the upper cranks 22 and adjusting arm 21, the remaining reflector may be tuned, and after which all clamp bolts 39 are tightened.

The upper cranks 22 may be eliminated and the lower cranks 22 employed instead. In this instance the upper clamps 37 of both reflectors 32 are tightened and the lower clamps 38 loosened. The operation is then carried out by tuning first one reflector and then the other loosening and tightening the upper and lower clamps 37 and 38 as required.

The invention is not limited to the embodiment herein shown and described, but may be made in many ways within the scope of the appended claims.

What is claimed is:

1. Means for tuning and securing a pair of reflectors on a radio tower, a vertical tubular shaft rotatably supported on said tower, a second shaft rotatably mounted in and extending through and above the first said shaft, a clamp connected with the upper end of each said reflector and adapted to be secured on the upper end of the second said shaft, other clamps connected with the lower end of each said reflector and adapted to be secured on the first said shaft, screw means rotating one of said shafts, and means adapted to secure the remaining said shaft against rotation.

2. Means for tuning and securing a pair of reflectors on a radio tower, a vertical tubular shaft rotatably supported on said tower, a second shaft rotatably mounted in and extending through and above the first said shaft, a clamp connected with the upper end of each said reflector and adapted to be secured on the upper end of the second said shaft, other clamps connected with the lower ends of each said reflector and adapted to be secured on the first said shaft, and means rotating each of said shafts independently of each other.

3. Means for tuning and securing a pair of reflectors on a radio tower, a vertical tubular shaft rotatably supported on said tower, a second shaft rotatably mounted in and extending through and above the first said shaft, a clamp connected with the upper end of each said reflector and adapted to be secured on the upper end of the second said shaft, other clamps connected with the lower end of each said reflector and adapted to be secured on the first said shaft, arms projecting from each said shaft, and screw means adapted to engage and rotate said arms independently of each other.

4. In combination with a radio transmission tower, a plate horizontally secured across the upper end of said tower, and another plate secured within and beneath the first said plate, a tubular shaft having a flange around the lower end thereof, said flange rotatably contacting the upper surface of the first said plate, a second shaft rotatably received within the first said shaft and extending through and above the latter and through and above the first said plate, a flange on the second said shaft rotatably contacting the upper surface of the lower said plate, a pair of reflectors having clamps on the lower and upper ends thereof, said upper clamps being detachably secured to said upwardly extending end of the second said shaft, said lower clamps being detachably secured to said first said shaft, and means rotating and securing said shafts independently of each other.

JOHNNIE ANDREWS.

REFERENCES CITED

The following references are of record in the file of this patent:

UNITED STATES PATENTS

| Number | Name | Date |
|---|---|---|
| 430,015 | Hanlon | June 10, 1890 |
| 1,522,020 | Maurer | Jan. 6, 1925 |
| 1,666,102 | McCarthy | Apr. 17, 1928 |
| 1,688,845 | Alvear | Oct. 23, 1928 |
| 1,842,224 | Wells | Jan. 19, 1932 |
| 2,264,850 | Koch | Dec. 2, 1941 |